United States Patent [19]

Akin

[11] 3,728,416

[45] Apr. 17, 1973

[54] PROCESS FOR PRODUCING HIGH SOFTENING, NON-CRYSTALLINE CONDENSATION COPOLYMERS

[75] Inventor: George A. Akin, Kingsport, Tenn.

[73] Assignee: Eastman Kodak Company, Rochester, N.Y.

[22] Filed: Aug. 25, 1971

[21] Appl. No.: 174,981

Related U.S. Application Data

[63] Continuation-in-part of Ser. No. 846,575, July 31, 1969, abandoned.

[52] U.S. Cl. ..................260/860, 260/47 R;47 C
[51] Int. Cl. ...........................................C08g 39/10
[58] Field of Search........................................260/860

[56] References Cited

UNITED STATES PATENTS 3,228,997  1/1966  Armstrong..........................260/860

Primary Examiner—Harold D. Anderson
Assistant Examiner—Edward Woodberry
Attorney—George P. Chandler et al.

[57] ABSTRACT

An improved process for the preparation of copolymers from a copolymer derived from terephthalic acid, isophthalic acid and Bisphenol A and a homopolymer derived from isophthalic acid and Bisphenol A by extruding a molten mixture of the copolymer and the homopolymer whereby copolymerization of the two p9lymers occurs in situ to produce a randomized copolymer. The process is thus useful in the production of a copolymer product which finds application in the production of fibers, films, sheets, molded objects and other products.

4 Claims, No Drawings

PROCESS FOR PRODUCING HIGH SOFTENING, NON-CRYSTALLINE CONDENSATION COPOLYMERS

This is a continuation-in-part of my application Ser. No. 846,575, filed July 31, 1969 now abandoned.

This invention relates to a process for preparing copolyesters in which the acid components are composed of approximately 35–65 mole percent terephthalic acid and approximately 65–35 mole percent isophthalic acid and the glycol component consists of Bisphenol A. More particularly the invention relates to a unique process whereby the copolyester is derived from a copolymer of terephthalic acid, isophthalic acid and 2,2-propylenebis(p-hydroxybenzene), hereinafter identified as Bisphenol A, and a homopolymer derived from isophthalic acid and Bisphenol A and is obtained by simple extrusion of a molten mixture of the copolymer and the homopolymer.

High softening condensation copolymers such as those derived from Bisphenol A and dicarboxylic acids such as terephthalic and isophthalic acids, useful in the production of fibers, films, sheets, molded objects and the like, frequently cannot be made commercially by the known melt reaction procedures because of their very high melt viscosities at the required polymerization reaction temperatures. These viscosities are sometimes so high that the required mechanical agitation of the reacting mass develops a sufficient degree of heat to cause thermal degradation of the polymer during the polymerization step. The effect of such an excess of heat in many instances results in the formation of undesirable excessive color in the polymer product and may also preclude attainment of the desired molecular weight.

One method of producing condensation polymers of the type referred to in the preceding paragraph is to employ the so-called solid phase polymerization technique. In this method, a low molecular weight polymer having a relatively low melt viscosity is first made by employing the melt technique. This low molecular weight polymer is then solidified, converted into a condition of high surface exposure, as, for example, by grinding the solidified material into a powder and then submitting the comminuted material to polymerizing conditions in the solid state. This usually involves the application of vacuum to a tumbling bed of powdered polymer, or the use of a fluidizing inert gas for the removal of low molecular weight reaction products. Although this process is satisfactory for the production of many polymers, some polymers tend to be sticky at the reaction temperature. These are usually copolymers which will not crystallize at all — or are very difficult to crystallize. An example of such a polymer is the copolyester derived from terephthalic acid and isophthalic acid with Bisphenol A. This material exhibits very high melt viscosities at allowable reaction temperatures and at the desired degree of polymerization. Furthermore, a low molecular weight polymer in powder form displays a pronounced tendency to be or to become sticky with the result that the polymer particles sinter together at the temperature required for polymerization to proceed, thus giving rise to extremely difficult processing conditions.

I have now found that a copolyester in which the acid components are composed of (I) approximately 35–65 mole percent terephthalic acid and (II) approximately 65–35 mole percent isophthalic acid and in which the glycol component consists of Bisphenol A can be made satisfactorily by a unique and extremely simple copolymerization process which completely eliminates the above-mentioned difficulties characteristic of hitherto known methods of producing this polymer.

According to one aspect of my invention there is provided a process of producing a linear copolyester having an inherent viscosity of at least about 0.6 measured in a solvent of 60/40 parts by weight of phenol and tetrachloroethane at about 25° C. and a concentration of 0.25 percent by weight composed of (I) about 35–65 mole percent terephthalic acid and about 65–35 mole percent isophthalic acid and (II) Bisphenol A, i.e., 2,2-propylenebis(hydroxybenzene), which comprises mixing (1) the copolymer having an inherent viscosity of at least about 0.5 of (a) between about 70 and 95 mole percent of terephthalic acid and between about 30 and 5 mole percent of isophthalic acid and (b) Bisphenol A and (2) a homopolymer having an inherent viscosity of at least about 0.5 of isophthalic acid and Bisphenol A, the copolymer constituting about 35 to 95 percent by weight of the mixture, melting the mixture and passing it through a screw extruder at a temperature from about 350° to 390° C. wherein it has a residence time of between about 1 minute and 10 minutes in contact with the screw of the extruder.

The invention, accordingly, has as its principal object to provide a simple and extremely effective method of producing a copolyester in which the acid components are composed of approximately 35–65 mole percent of terephthalic acid and approximately 65–35 mole percent of isophthalic acid and the glycol component consists of Bisphenol A.

Another object is to provide a process for producing a copolyester in which the acid components are composed of approximately 35–65 mole percent of terephthalic acid and approximately 65–35 mole percent of isophthalic acid and the glycol component consists essentially of Bisphenol A, whereby manipulative and other difficulties attributable to high melt viscosities, sintering of particles, and similar adverse processing conditions are eliminated.

A further object is to provide an easily operable process for producing a copolyester in which the acid components are composed of approximately 35–65 mole percent of terephthalic acid and approximately 65–35 mole percent of isophthalic acid and the glycol component consists essentially of Bisphenol A, which can be employed in the production of a wide variety of useful products such as fibers, films, sheets, molded objects and the like.

Other objects will appear hereinafter.

These objects are accomplished by the following invention which, in one embodiment thereof, comprises, first, preparing a copolymer composed of approximately 70–95 mole percent of terephthalic acid, 30–5 mole percent of isophthalic acid and 100 mole percent of Bisphenol A. Such a polymer can be prepared by methods already known to those skilled in the art but one such method is illustrated by Example 1 set forth hereinafter; second, preparing a homopolymer composed of 100 mole percent isophthalic acid and 100 mole percent Bisphenol A by substantially the same method as illustrated by Example 2. The prepolymers of both of these materials having inherent viscosities between about 0.2 and 0.4 can be readily crystallized and brought to the desired molecular weight, as, for example, by heating under vacuum to a temperature within the range of 255° to 280° C., preferably to a temperature of approximately 260° C.

Determination of the amount of copolymer to be included in the mixture proceeds in the following manner. Selecting the desired characteristics of the final copolyester, the ratio of terephthalic acid to isophthalic acid and terephthalic acid in the final product is determined. This ratio is divided by the ratio of terephthalic acid to isophthalic acid and terephthalic acid in the copolymer giving the fractional part of copolymer to the sum of copolymer and homopolymer required to produce the desired copolyester.

Thus, in order to produce a linear copolyester containing approximately 50 mole percent of terephthalic acid and approximately 50 mole percent of isophthalic acid and 100 mole percent Bisphenol A, and assuming the copolymer contains 70 mole percent terephthalic acid, 30 mole percent isophthalic acid, and 100 mole percent Bisphenol A, 71.5 percent by weight of mixture must be copolymer. A mixture of 100 parts by weight of the copolymer with 40 parts by weight of the homopolymer of isophthalic acid and Bisphenol A meets these proportion requirements.

The mixture is fed into the hopper of a conventional screw-type extruder or equivalent apparatus provided with appropriate heating means. As the mixture passes through the extruder it is heated within the range of 350°–390° C. and preferably to about 370° C. under which conditions the two polymers form a molten mixture or homogeneous blend. The screw element of the extruder is operated at such a speed that the residence time of the mixture of polymers in the extruder is approximately 1 to 10 minutes, preferably about 5 minutes. Residence time is measured by the free volume of the extruder in cubic feet divided by the throughput of the molten polymer in cubic feet per minute.

During passage through the extruder copolymerization of the two polymers occurs in situ. The resulting copolymer of copolyester and homopolyester is then extruded through the extrusion orifice of the extruder. The orifice of the extruder may, for example, be a circular opening and of such diameter as to produce an extruded rod one-eighth inch in diameter. As the rod of the molten material emerges from the orifice it may be cut into pellets about one-eighth inch long, which is the form preferred by most manufacturers for subsequent processing of the material into such products as fibers, films, sheets, molded objects and similar items. Of course, the molten copolymer may also be extruded directly to form such products.

I have found that, quite surprisingly and contrary to what would be expected, the extruded polymer does not exhibit the individual characteristics of the two components from which it is derived but, in the extrusion process, has become a homogeneous material that exhibits desirable non-crystallizing and other desirable characteristics and properties of a polymer prepared from approximately equal parts of terephthalic acid and isophthalic acid with Bisphenol A by the difficultly operable solid phase method. It is especially notable that the physical properties of the material produced in accordance with the invention are, in general, substantially identical with those of the material prepared by the solid phase technique. This is clearly brought out in the following tabulation.

COMPARISON OF POLYMERS MADE BY SOLID PHASE POLYMERIZATION AND BY COPOLYMERIZATION BY MIXING AND EXTRUSION

| Physical Properties | Polymer Made Directly By Solid Phase Method | Polymer Made by Mixing and Extrusion |
|---|---|---|
| I.V. | 0.80 | 0.63 |
| Molding Temp. | 750°F. | 725°F. |
| Hardness (1) | L-112 | L-110 |
| Tensile Yield, psi (2) | 10,100 | 10,100 |
| Tensile Break, psi (2) | 9,600 | 10,900 |
| Tensile Elongation (2) | 47% | 80% |
| Flex Strength, psi (3) | $3.1 \times 10^5$ | $3.15 \times 10^5$ |
| Impact V notch (4) | 2.3 | 4.3 |
| Heat Distortion Temp. (5) | 200°C. | 196°C. |
| I.V. of molded specimen | 0.58 | 0.62 |

(1) Rockwell Hardness - ASTM Test - D-785-51-Method A
(2) Tensile Yield Tensile Break Tensile Elongation - ASTM Test -D- 1798-59T
(3) Flexural Modulus - ASTM Test - D-790-58T
(4) Izod Impact V notch - ASTM Test - D-256-56-Method A
(5) Heat distortion temperature - as measured in a forced-convection oven with a 2-inch flexure bar at 264 psi.

Differential thermal analysis (method described in "Thermoanalytical Methods of Investigation" by Paul D. Garn, published by Academic Press, New York, New York, 1965 edition, pages 16–52) of the polymer prepared by mixing and extruding in accordance with the instant invention indicates that a high degree of ester interchange has occurred and that the product is definitely a random copolymer. This is quite surprising, especially when one takes into consideration that the residence time in the extruder at elevated temperatures is generally of the order of 5 minutes or less.

A typical example of the preparation of the terephthalic acid-isophthalic acid-Bisphenol A copolymer component to be employed in the extrusion process of my invention is described in Example 1 below. Likewise, an example of the preparation of the isophthalic-Bisphenol A homopolymer component is described in Example 2. Although the preparation of both of these components is, in general, known to those skilled in the art, an improved process for the preparation of these polymers is described and claimed in the now abandoned patent application of Winston J. Jackson, Jr., Herbert Kuhfuss and John R. Caldwell filed on or about Apr. 17, 1969, Ser. No. 817,137 and entitled

IMPROVED PROCESS FOR PREPARING BISPHENOL A COPOLYESTERS.

EXAMPLE 1

Preparation of a copolymer containing 70 mole percent of terephthalic acid and 30 mole percent of isophthalic acid and 100 mole percent of Bisphenol A may be carried out as follows:

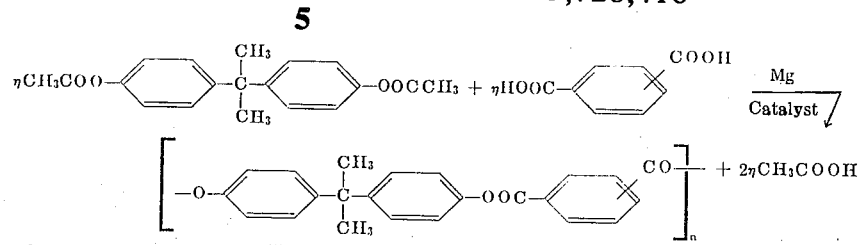

where $n$ is a number sufficient to give the desired inherent viscosity.

A 500 ml., round-bottom flask is fitted with a stainless steel stirrer and a short head with inlet and outlet for nitrogen. The nitrogen outlet, which is connected to a receiver, has provision for applying vacuum. In the flask are placed 29.05 g. (0.175 mole) of terephthalic acid, 12.45 g. (0.075 mole) of isophthalic acid, 78 g. (0.25 mole) of Bisphenol A diacetate, and 0.0025 g. of magnesium powder. The flask and contents are then evacuated and purged three times with nitrogen. The flask is kept under 100 mm. pressure (to aid in removing the acetic acid as it is formed and to help prevent air from contacting the reaction mixture). The flask and contents are lowered into a Wood's metal bath maintained at 150° C. Stirring is started and the temperature is raised to 250° C. over a period of 45 minutes. Acetic acid slowly distills from the flask, and elimination of the acid is practially complete after 70 minutes. The melt at this stage is still opaque. The temperature of the bath is next increased to 295° C. and held for 20 minutes. The melt is clear at this time. The pressure is reduced gradually to approximately 0.5 mm. Hg in 15 minutes. After 30 minutes under full vacuum a high-melt viscosity prepolymer is obtained. The amorphous prepolymer is cooled under vacuum. It has an inherent viscosity (I.V.) of about 0.4, whereas variations of the process of this example may give I.V. values between about 0.3 and 0.5. The prepolymer is then ground to pass a 20-mesh sieve, the 20-mesh particles are soaked in toluene at room temperature and finally in hot toluene until they crystallize. The prepolymer is then dried. Further build-up in inherent viscosity is accomplished by heating the 20-mesh particles at reduced pressure (0.05 – 0.01 mm. Hg) at 180° C. up to 280° C., holding at 280° C. for 4 hours. The polymer has an I.V. of 0.81 as determined in a solution of 60/40 phenol-tetrachloroethane.

EXAMPLE 2

The preparation of this homopolymer containing 100 mole percent of isophthalic acid and 100 mole percent of Bisphenol A is prepared by the same procedure described in Example 1 except that 41.5 g. (0.25 mole) of isophthalic acid is employed, with no terephthalic acid being present. The resulting homopolymer is found to have an I.V. of 0.83.

EXAMPLE 3

Two pounds of copolymer (100 parts by weight or 71.5 percent by weight of the mixture) prepared as in Example 1 is mixed with 0.8 pound (40 parts by weight) of homopolymer prepared as in Example 2. This mixture of polymers is fed to a ¾ inch barrel diameter screw extruder 15 inches long which is equipped with a ⅛ inch circular orifice in the discharge end for extruding a rod. The extruder is heated electrically over 12 inches of its length toward the discharge end to a barrel temperature measured at the discharge end of 370° C. The extruder has a free volume of about 3.0 cubic inches. The extruder is rotated at a speed to give an extrusion rate of 0.6 cubic inch per minute which results in a residence time of 5 minutes. The extruded rod is quenched in water and cut into pellets about ⅛ inch long. The polymer is found by analysis to be the reaction product of about 50 mole percent terephthalic acid, about 50 mole percent isophthalic and 100 mole percent Bisphenol A. The properties of the polymer obtained are described in the table above.

EXAMPLE 4

The procedure of Example 1 is repeated except the final bath temperature is 355° C and 95 mole percent of terephthalic acid and 5 mole percent of isophthalic acid are used in preparing the copolymer. 68.5 Parts by weight of this copolymer and 31.5 parts by weight of a homopolymer prepared as described in Example 2 are mixed and extruded as described in Example 3 at a barrel temperature of 390° C. and a residence time of about 8 minutes. The resulting polymer is a clear, homogeneous material exhibiting non-crystalline characteristics and can be molded into tough, hard objects. The polymer is analyzed and found to be the reaction product of 65 mole percent terephthalic acid, 35 mole percent isophthalic acid and 100 mole percent Bisphenol A.

EXAMPLE 5

The procedure of Example 1 is repeated except 70 mole percent terephthalic acid and 30 mole percent isophthalic acid are used in preparing the copolymer. Fifty parts by weight of this copolymer and 50 parts by weight of the homopolymer prepared as described in Example 2 are mixed and extruded as described in Example 3 at a barrel temperature of 355° C. and a residence time of approximately 2 minutes. The resulting polymer is a clear, homogeneous material which is non-crystallizing. The polymer is analyzed and found to be the reaction product of 35.3 mole percent terephthalic acid, 64.7 mole percent isophthalic acid and 100 mole percent Bisphenol A.

It will thus be seen from the above description that my invention provides a simple and unique method of preparing a copolyester in which the acid components are composed of approximately 35– 65 mole percent terephthalic acid and approximately 65–35 mole percent isophthalic acid and the glycol component consists of Bisphenol A. As previously explained, this process obviates the extremely difficult processing conditions usually encountered in preparing such a copolyester by the so-called solid phase polymerization technique. Because of the relatively low temperature to which the reactants are subjected during production of the product, the product emerges from the process free from discoloration and other adverse characteristics often present when such a copolyester is produced by known methods.

The utility of the invention is self-evident in that it represents a definite technical advance in the art by eliminating the aforementioned practical difficulties heretofore encountered in the production of copolyesters in which the acid components are composed of approximately 35–65 mole percent terephthalic acid and approximately 65–35 mole percent isophthalic acid and the glycol component consists of Bisphenol A. In this regard reference is again made to the above-mentioned Jackson, Kuhfuss and Caldwell application, Ser. No. 817,137, filed on or about Apr. 17, 1969, and now abandoned.

Although the invention has been described in considerable detail with reference to certain preferred embodiments thereof, it will be understood that variations and modifications can be effected without departing from the spirit and scope of the invention as described hereinabove.

I claim:

1. A process of producing a linear copolyester having an inherent viscosity of at least about 0.6 measured in a solvent of 60/40 parts by weight of phenol and tetrachloroethane at about 25° C. and a concentration of 0.25 percent by weight, said copolyester being composed of (I) approximately 35–65 mole percent terephthalic acid and approximately 65–35 mole percent isophthalic acid and (II) 2,2-propylene-bis-(p-hydroxybenzene) hereinafter identified as Bisphenol A, which process comprises steps of (A) and (B) as follows:

A. mixing (1) a copolymer having an inherent viscosity of at least about 0.5 of (a) about 70–95 mole percent terephthalic acid and about 30–5 mole percent isophthalic acid and (b) Bisphenol A and (2) a homopolymer having an inherent viscosity of at least about 0.5 of isophthalic acid and Bisphenol A, the copolymer comprising about 35–95 percent by weight of the mixture;

B. melting and copolymerizing said copolymer and homo-polymer by passing the mixture through a screw extruder at a temperature from about 350° to 390° C. wherein the mixture has a residence time of between about 1 minute and 10 minutes in contact with the screw of said extruder.

2. The process of claim 1 in which there is employed about 100 parts by weight of the said copolymer (1) which is composed of approximately 70 mole percent terephthalic acid, approximately 30 mole percent of isophthalic acid and 100 mole percent of Bisphenol A, and about 40 parts by weight of the homopolymer (2) which is composed of equal mole proportions of isophthalic acid and Bisphenol A.

3. The process of claim 2 in which the mixture of copolymer and homopolymer is melted by subjecting the mixture to said temperature of 350°C.–390°C. while in contact with at least half the length of the screw of the extruder.

4. The process of claim 3 in which the residence time of the polymer mixture in the extruder is about 5 minutes.

* * * * *